Jan. 31, 1967 E. O. P. TATTER 3,301,562

SPINDLE ADAPTER

Filed April 9, 1964 2 Sheets-Sheet 1

INVENTOR
Ernest O. P. Tatter
BY
Hofgren, Wegner,
Allen, Stellman & McCord Att'ys Jan. 31, 1967 E. O. P. TATTER 3,301,562

SPINDLE ADAPTER

Filed April 9, 1964 2 Sheets-Sheet 2

United States Patent Office 3,301,562

Patented Jan. 31, 1967

3,301,562

SPINDLE ADAPTER

Ernest O. P. Tatter, Addison, Ill., assignor to Warwick Electronics Inc., a corporation of Delaware Filed Apr. 9, 1964, Ser. No. 358,569
16 Claims. (Cl. 274—10)

This invention relates to spindle adapters, and more particularly to a spindle adapter for handling large hole records.

In certain types of record changers currently available, a small hole record spindle is associated with the turntable of a record changer for handling small hole records and has record ejector mechanism. When it is desired to play commercially available records having a relatively large hole in the center thereof, it is necessary to utilize an adapter. If automatic changing of these records is to occur, the adapter mechanism must have means for supporting a stack of records and selectively feeding the lowermost record of the stack from the stack so that it may move onto the turntable. In the past, the mechanism associated with the adapter has embodied a plurality of movable interconnected parts forming record supporting shelves and record separating blades which constitute a complex mechanical structure which is costly to manufacture and assemble. Thus, the general purpose of the present invention is to provide a spindle adapter which is simple in construction and efficient in operation, yet which has a minimum number of parts for automatically changing large hole records, and is therefore relatively inexpensive to manufacture and maintain.

In order to prevent the unimpeded dropping of records from a spindle shelf to a turntable during a record change cycle, it hs been proposed to provide retractable fingers in the spindle which define a recording supporting shelf, and which are vertically movable so as to lower the record to the turntable. Such record lowering devices are typified by those shown in the copending patent applications, Serial No. 276,253 of Ernest O. P. Tatter and Paul W. Schaff for a Record Changer, filed April 29, 1963; and Serial No. 352,506 of Ernest O. P. Tatter for a Record Changer, filed March 17, 1964. Accordingly, it is an object of the present invention to provide a spindle adapter for handling large hole records, which is particularly adapted for use in a record changer having a record lowering mechanism associated with the spindle thereof.

In another type of spindle construction, a plurality of fingers are retractably mounted on the spindle and in their exposed position define a record supporting shelf. The lowermost record of a record stack is ejected by retracting the fingers into the interior of the spindle, and additional fingers are provided to hold the remaining stack of records during the ejection of the lowermost record. Accordingly, it is another object of the present invention to provide a spindle adapter for handling large hole records which is particularly adapted for use with the above described type of spindle construction.

A further object of the invention is to provide a spindle adapter for handling large hole records which is readily convertible from use with small hole records for use with large hole records and vice versa.

A still further object of the invention is to provide a spindle adapter as defined in the preceding paragraph wherein portions of the adapter are mounted for pivotal movement into an out of the way position within the turntable when it is desired to play small hole records.

Further objects and advantages will become more fully apparent from the following detailed description taken in connection with the accompanying drawings in which.

Figures 1, 2, 3, 4:
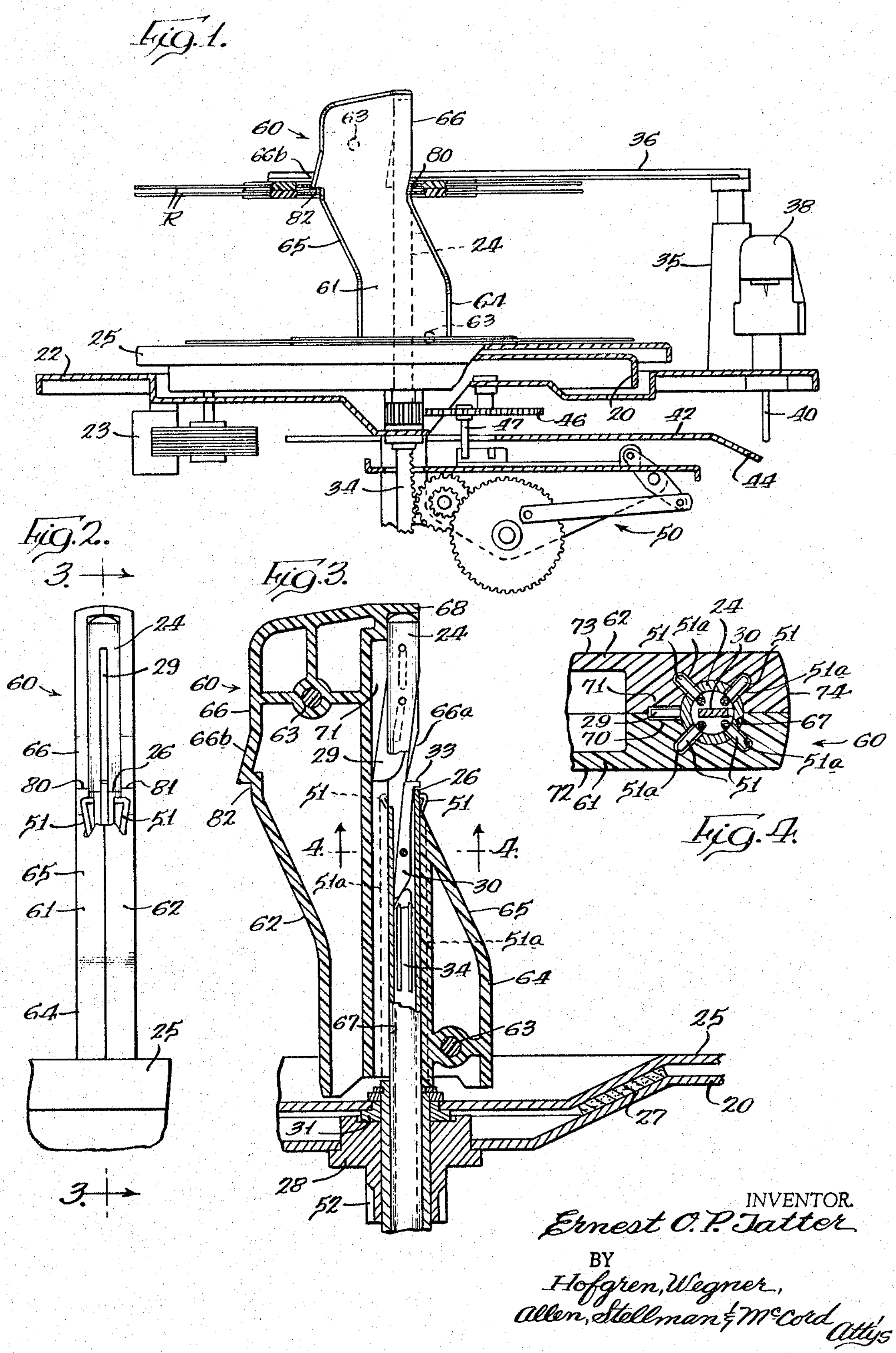
FIG. 1 is a side elevational view of a preferred embodiment of the invention with parts in section and broken away.
FIG. 2 is an enlarged fragmentary front elevational view of the adapter illustrated in FIG. 1.
FIG. 3 is a sectional view taken generally along line 3—3 of FIG. 2.
FIG. 4 is an enlarged sectional view taken generally along line 4—4 of FIG. 3.

While this invention is susceptible of embodiment in many different forms, there is shown in the drawings and will herein be described in detail only preferred embodiments of the invention with the understanding that the present disclosure is to be considered as an exemplification of the principles of the invention and is not intended to limit the invention to the embodiments illustrated. The scope of the invention will be pointed out in the appended claims.

The embodiment of the record changer illustrated in FIG. 1 has a first turntable 20 above a motor board 22 and supported thereon for rotation. The motor board 22 can be mounted within a phonograph cabinet or on a support (not shown). The turntable 20 is rotatable at a selected speed by a turntable motor 23 and speed change mechanism fixedly connected to the motor board 22.

A second turntable 25 which is concentric with turntable 20 is positioned above turntable 20 and is substantially parallel thereto. Upper turntable 25 is drivingly rotated by lower turntable 20 through the medium of a suitable high frictional material 27 (FIG. 3) that is interposed therebetween. Upper turntable 25 is centrally supported by a washer 31 which, in turn, is carried on a bushing 28. Washer 31 is made of a low frictional material so that the mating surfaces of washer 31 and bushing 28 move relatively free of friction. The upper turntable can be stopped during lowering of the records in the manner described in the above mentioned application of Tatter and Schaff.

Standing upwardly and centrally of the turntable 25 is a small hole record spindle 24 which is supported by the motor board 22. The spindle 24 has a shelf 26 for supporting a stack of records, which are indicated at R. Spindle 24 has a record ejecting mechanism including an ejector lever 30 having an upper portion 33 which travels through a path to shift the lowermost record of the record stack from the shelf 26 whereby the record is placed in position for lowering to the upper turntable 25. The spindle 24 has a retainer plate 29 slidably carried thereon for prevening the records in a stack of small hole records from being ejected from the shelf 26 by ejector lever 30, as is well known in the art. The operation of ejector lever 30 is effected by vertical movement of a push rod 34 passing upwardly through the hollow spindle 24 and into engagement with the ejector lever 30 to pivot it into its ejecting position shown in FIG. 3.

An upright post 35 is mounted on the motor board 22 adjacent to the turntable 25. The post 35 has a telescopically mounted, swingable hold-down arm 36 for engaging the top record of the record stack to hold records in a horizontal position on the spindle 24 above the turntable 25. As is well known in the art, the arm 36 may be raised and pivoted away from its position overlying the record stack so that the records may be removed from the spindle or more records may be added to the stack.

A tone arm 38 is pivotally mounted on motor board 22 in the conventional manner, and is operated in up and down movements by the vertical shift of a tone arm engaging pin 40 which extends beneath the motor board 22 to an exposed position whereupon vertical movement of pin 40 results in corresponding vertical movement of the tone arm 28. A record change cycle, including operation of the record ejecting lever 30 and tone arm 38, causes the inclined flange 44 of a main slide plate 42, which is mounted beneath the motor board for reciprocal movement, as is well known in the art, to actuate pin 40; and other surfaces on main slide plate 42 actuate tone arm 38 in its pivotal movement.

The means for effecting the reciprocating movement of main slide plate 42 includes a drive gear 46 that is rotatably supported on motor board 22, and which has a downwardly extending eccentric pin 47 fixed thereon. As is well known in the art, gear 46 remains idle during normal playing conditions, and rotates during a record change cycle. The movement of pin 47 during the record change cycle is utilized to reciprocate main slide plate 42, as well as to actuate the record lowering means, shown generally at 50 in FIG. 1.

The record lowering means are described in detail in the above mentioned Tatter application, and include a plurality of fingers 51 which are carried on push rod 34 and which are retractable into the interior of hollow spindle 24. A sleeve 52 is fixed to the motor board and surrounds spindle 34. Sleeve 52 functions to cam fingers 51 into the interior of the spindle as the push rod 34 is lowered within the spindle. While the illustrated embodiment shows four fingers 51, and four corresponding slots in the spindle 24, it should be understood that the present invention is not limited to any particular number of fingers and slots and more or less may be provided as desired.

The spindle adapter embodiment, which is adapted to be used with the spindle described above, is indicated generally at 60 in FIGS. 1–4. The adapter 60 is formed of two similar parts 61 and 62 suitably secured together as by adhesive, or, as shown, by a plurality of machine screws 63. The adapter body formed by the parts 61 and 62 is generally rectangular in cross section throughout the height thereof, and is defined by a lower section 64, an intermediate section 65, and an upper section 66. Extending longitudinally through the adapter body is a central passage 67 for receiving the small hole record spindle 24, and the height of the adapter relative to the turntable is fixed by engagement of a cap portion 68 of the adapter's upper section with the top of the small hole spindle. The adapter 60 is held fixed against rotation by engagement of a pair of longitudinally extending flanges 70 and 71 on the adapter parts 61 and 62, respectively, with the slider member 29 of the small hole record spindle 24. Flanges 70 and 71 define an elongate space receiving the slider member and also the rear part of the ejector lever 30. This space at the location of the slider member 29 is slightly narrower so that, with the slider member and ejector lever having the same thickness, the ejector lever will have freedom of motion.

With the rectangular cross section of the adapter 60, a pair of straight sides 72 and 73 are provided which have a length dimension greater than a pair of connecting sides 74, only one of which is shown in FIG. 4. The sides 74 have their faces curved to correspond to the curvature of the center hole of a large hole record to accurately guide the record during its rotation.

A record supporting shelf for the spindle adapter is provided by a pair of shoulders 80 and 81 formed at the upper end of the adapter central portion 65 and which are at a level above the shelf 26 of the small hole record spindle 24, as shown in FIG. 2. The shelf defined by shoulders 80 and 81 supports records independently of the shelf 26 of the small hole record spindle. The front side 66a of the lower portion of the upper section 66 of the spindle adapter is inclined downwardly and inwardly, as shown in FIG. 3, to permit a record to move into the adapter shelf; and the opposite rear face 66b of the adapter, at the lower portion of the upper section 66, is correspondingly sloped downwardly and outwardly, as shown in FIG. 3, to positively guide a record down onto the adapter shelf. The sloped side last referred to terminates a distance above the adapter shelf at least equal to the thickness of a large hole record, and the adapter is recessed, as indicated at 82, so that a record may shift to the right, as viewed in FIG. 3, off the adapter shelf. The passage 67 opens to the exterior of the adapter at the location of the adapter shelf, so that the ejector lever 30 of the small hole record spindle, when pivoted by the push rod 34, can move to engage within the hole of a record and shift the record to the right for movement off the adapter shelf and down onto the turntable 25. The intermediate section 65 of the adapter is inclined, as shown in FIG. 3, to lead a record down to the lower section 64 which is concentric with the small hole spindle 24. As can be best seen in FIG. 4, a plurality of radial slots 51a, one for each finger 51, are provided in adapter sections 61 and 62. Slots 51a are formed in the wall surrounding passage 67, and extend substantially from end-to-end thereof. Slots 51a are slightly larger than fingers 51 so that the fingers are free to move therein without binding. Thus, as a large hole record is ejected off of the adapter shelf, it will come to rest upon the upper portion of fingers 51, which gently lower the record to the intermediate portion adapter 95 for movement to the turntable, as push rod 34 moves downwardly in the spindle 24.

Figures 5, 6:
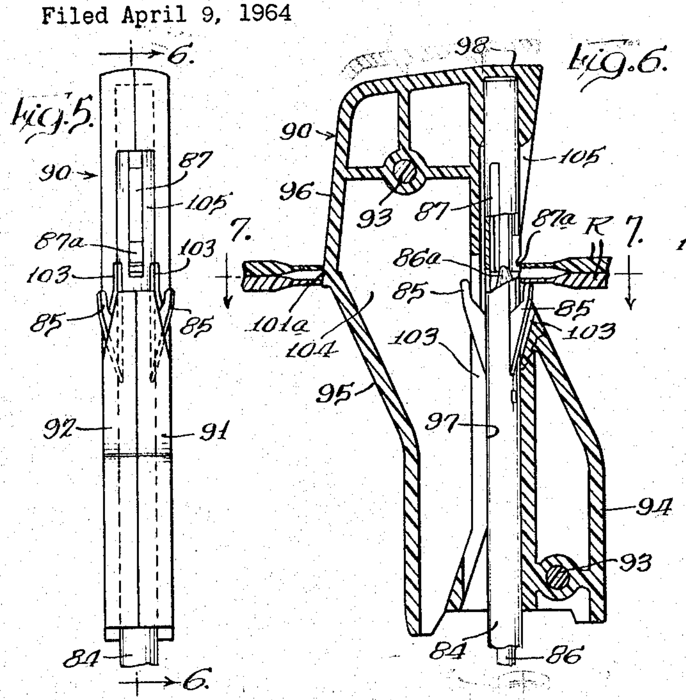
FIG. 5 is a fragmentary front elevational view similar to FIG. 2, and showing another form of the invention.
FIG. 6 is a sectional view taken generally along line 6—6 of FIG. 5.
Figure 7:
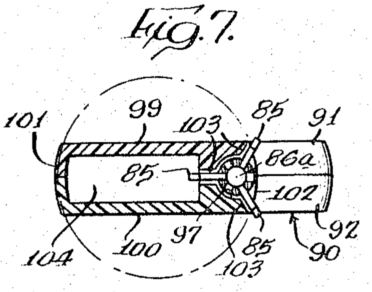
FIG. 7 is a sectional view taken generally along line 7—7 of FIG. 6.

A modified form of spindle adapter is shown generally at 90 in FIGS. 5–7, and is used in connection with a small hole record spindle 84 which has no spindle shelf for supporting a stack of records, and no ejector lever. Ejection of the lowermost record in the record stack supported on spindle 84 is acomplished by the withdrawal of a plurality of record supporting fingers 85 into the interior of spindle 84 through suitable slots provided therein. A push rod 86 is vertically movable in hollow spindle 84 for operation of fingers 85, and includes a conical upper portion 86a for actuating a plurality of record stack supporting fingers 87. Fingers 87 are urged outwardly of suitable slots in the spindle 84, and a lip 87a provided on the end thereof engages the second lowermost record in the record stack to support the same. Thus, at the end of a playing cycle, turntable mechanism, not shown, will actuate push rod 86 and collapse fingers 85 into the interior of the record spindle to free the lowermost record in the record stack for movement to the turntable. Fingers 87 will function to hold the remaining records of the record stack during the ejection of the lowermost record, and when push rod portion 86a moves out of engagement with the fingers 87, the remaining records of the record stack will be freed for movement to the fingers 85. While the illustrated embodiment shows three fingers 85, and three fingers 87, with an appropriate slot being provided in the spindle for each finger, it should be understood that the present invention is not limited to any particular number of fingers and slots, and more or less may be provided, as desired.

Adapter 90 is shaped similarly to the adapter shown in FIGS. 1–4, and is formed to two similar parts 91 and 92 which are suitably secured together as by machine screws 93, or the equivalent. As may be best seen in FIG. 7, the adapter body formed by parts 91 and 92 is generally rectangular in cross section throughout the height thereof. As may be best seen in FIG. 6, the adapter body is defined by a lower section 94 which is concentric with spindle 84, and intermediate section 95 which is inclined with respect to the axis of the spindle 84, and an upper section 96 which is also inclined with respect to the axis of the spindle 84. Extending longitudinally through the adapter body is a central passage 97 for receiving the small hole record spindle 84, and the height of the adapter relative to the turntable is fixed by engagement of a cap portion 98 of the adapter's upper section with the top of the small spindle. With the rectangular cross section of the adapter 90, a pair of straight sides 99 and 100 are provided which have a length dimension greater than a pair of connecting sides 101 and 102. Sides 101 and 102 have their faces curved to correspond to the curvature of the center hole of a large hole record to accurately guide the record during its rotation. A plurality of slots 103, one for each finger 85, are provided in the adapter wall surrounding passage 97. As can be best seen in FIG. 7, slots 103 extend generally radially outwardly from passage 97, and in the illustrated spindle embodiment wherein three fingers 85 are provided, two of the slots 103 are provided at the corners of front face 102 adjacent the upper portion of intermediate section 95, and the third slots 103 open into a hollowed portion 104 provided at the rear of the adapter. Thus, two of the fingers 85 will be exposed at the front portion of the adapter 90 to define a shelf for supporting the record stack. It will, of course, be understood that a suitable hold down member, such as that shown at 36 in FIG. 1, will be provided to retain the records balanced upon the fingers 85.

A generally vertically extending opening 105 is provided in the upper portion 96 of spindle 90, and is defined by mating notches on spindle sections 91 and 92. Opening 105 is spaced between the forwardly facing slots 103, and the forwardly facing finger 87 is adapted to extend outwardly therefrom into engagement with the second lowermost record of a record stack, as is best seen in FIG. 6. Lip portion 87*a* of the exposed finger 87 is positioned in general horizontal alignment with the terminal portion 101*a* of the rear face 101 of the upper spindle adapter section 96, and cooperates therewith to support the record stack while fingers 85 collapse to free the lowermost record for movement to the turntable. Thus, as push rod 86 moves upwardly in spindle 84 to pivot fingers 85 into the interior of the spindle and free the lowermost record for movement to the turntable, finger portion 87*a* of the forwardly facing finger 87 will be forced outwardly of the spindle into engagement with the second lowermost record by the upper portion 86*a* of push rod 86, and terminal portion 101*a* and finger portion 87*a* will cooperate to hold the remaining records of the record stack while the lowermost record moves to the turntable. When push rod 86 moves downwardly in spindle 84, fingers 85 will be pivoted outwardly of the spindle into a record supporting position, and push rod portion 86*a* will move out of engagement with fingers 87 so that the record stack will come to rest upon the fingers 85. Slots 103 are preferably slightly wider than the thickness of fingers 85, so that the fingers are free to move into and out of the spindle without binding upon the adapter.

Figures 8, 9, 10:
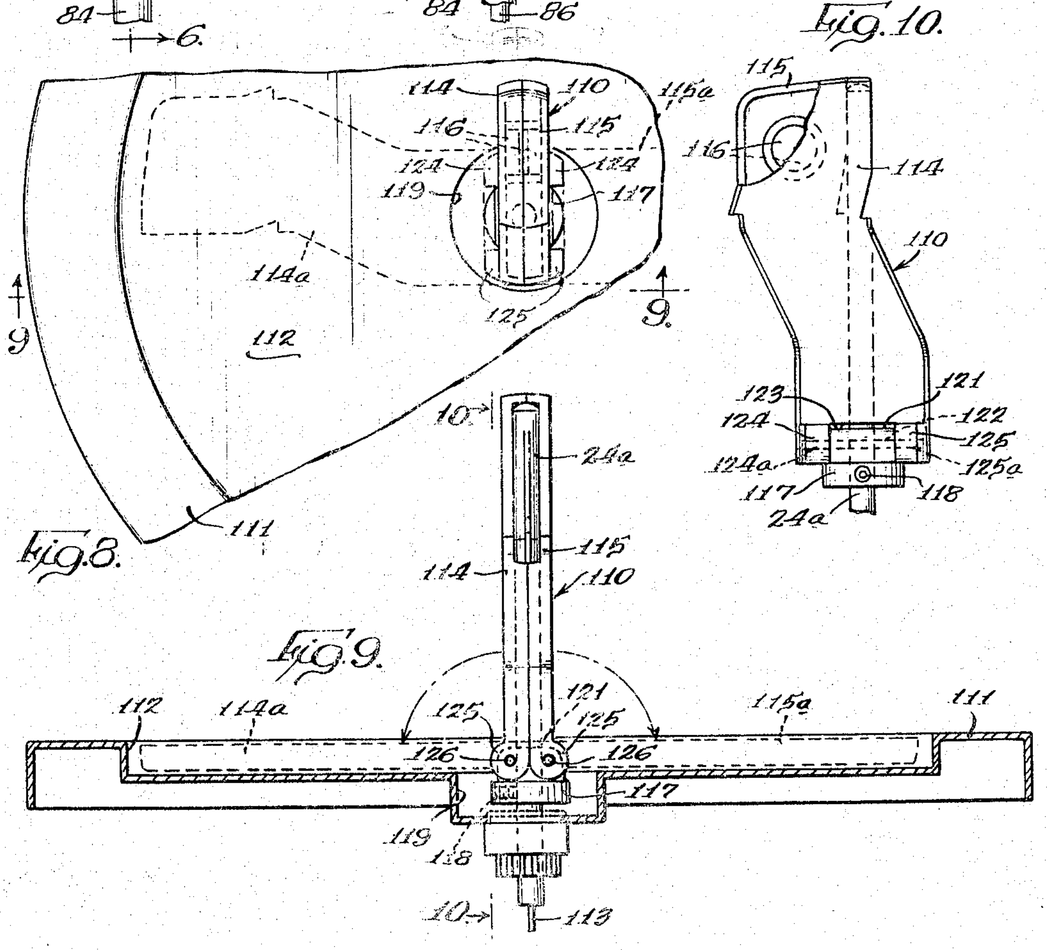
FIG. 8 is a fragmentary pla nview of a record changer utilizing still another form of the present invention.
FIG. 9 is a sectional view taken generally along line 9—9 of FIG. 8.
FIG. 10 is a side elevational view of the spindle embodiment illustrated in FIGS. 8 and 9 with certain parts broken away for clarity.

Referring now to FIGS. 8–10, another form of spindle adapter 110 is shown which is readily convertible from use with small hole records to use with large hole records, and vice versa. While adapter 110 has been shown as having a configuration which is substantially identical to that of the adapter illustrated in FIGS. 1–4, and used in connection with an ejector lever type of spindle 24*a*; it should be understood that the adapter configuration may be formed such as that shown in FIGS. 5–7, for use in a spindle having no ejector lever. Spindle 110 is used in connection with a turntable 111 having a dished or recessed central portion 112. Means, not shown, similar to that illustrated in FIG. 1, are provided for rotating turntable 111 and for operating a push rod 113 of spindle 24*a*.

Adapter 110 is defined by a pair of substantially identical sections 114 and 115 which are movable from an upright large hole record playing position, such as that shown in FIGS. 8–10, to a folded position within the turntable recess 112, such as that shown at 114*a* and 115*a* in FIGS. 8 and 9. Suitable means are provided for releasably holding the adapter sections 114 and 115 in the upright position, and in the illustrated embodiment, aligned magnets 116 are provided in each adapter section for this purpose.

Means are provided for mounting the adapter sections for movement into the recessed portion 112 of the turntable, and include a sleeve 117 fixed on the spindle 24*a*, as by a set screw 118. As can be best seen in FIGS. 8 and 9, sleeve 117 is positoned in a well 119 which is provided in the center of the turntable 111. An upwardly extending hub 121 is provided on sleeve 117, and a pair of spaced, horizontally extending bores 122 are provided in hub 121. Each adapter section is provided with a downwardly open central notch 123 at the lower end thereof, which define a pair of spaced apart ears 124 and 125 on each adapter section that embrace the ends of hub 121. Ears 124 and 125 are provided with bores 124*a* and 125*a*, respectively, which are aligned with the bores 122 in hub 121. Pins 126 impale bores 124*a*, 122 and 125 to mount each of the adapter sections 114 and 115 for pivotal movement. Thus, when it is desired to play small hole records, the adapter sections 114 and 115 are manually gripped and pulled apart to overcome the attractive force of magnets 116. The adapter sections are lowered into recessed portion 112 of turntable 111, and it is clear from FIG. 9 that the adapter sections are movable to a position disposed completely below the upper surface of the turntable so that the records can rest freely upon the turntable. It should be noted that it is not necessary that recessed portion 112 be circular in shape, and it will be sufficient for the purposes of the present invention to provide recess portions that are sufficiently wide to accommodate the adapter sections 114 and 115 when they are in the folded position. It will be readily apparent that when it is desired to play large hole records, the adapter sections may be manually lifted from the recessed portion of the turntable, and folded upwardly to a position where the magnets 116 will hold them in the upright position shown in the drawings.

From the foregoing it should be apparent that each of the objects of the invention have been fully achieved.

I claim:

1. A spindle adapter for use with a record changer having a rotatable turntable and a record ejecting spindle with a plurality of fingers mounted for movement between an exposed position outside of said spindle to a retracted position within said spindle, said adapter comprising: a vertically elongate body including, an inclined upper section having a record stack supporting lower portion, a generally vertically extending lower section having a surface concentric with said spindle for guiding records during movement to the turntable and during rotation of said turntable, and an intermediate section inclined oppositely from the inclination of the upper section and guiding ejected records to said lower section; means defining a longitudinal interior passage in the body for receiving the spindle; and a plurality of radial slots, one for each finger, extending outwardly from said passage, at least one of said slots opening outwardly of said adapter body, so that the respective finger may extend outwardly of the adapter body into position for engagement with a record.

2. The invention as defined in claim 1 wherein said adapter body is defined by a pair of substantially identical members which are mounted for pivotal movement away from said spindle so that small hole records may be played on said record changer.

3. A spindle adapter for use with a rotatable phonograph turntable and a spindle of relatively small diameter for records having center holes of correspondingly small diameter, said spindle having a shiftable lever for laterally shifting a record relative to said spindle and a plurality of fingers mounted for movement between an exposed position outside of said spindle to a retracted position within said spindle, said fingers being movable vertically to lower an ejected record to the turntable, said adapter comprising: a generally rectangular body for supporting and centering a stack of records with large diameter center holes, said body having a dimension in one direction almost equal to the diameter of the large hole of a large center hole record and a lesser dimension in a transverse direction, said body having a passage extending for substantially the entire length thereof for placement on said spindle and a cap at the top of said body engageable with the upper end of the spindle to position said body on the spindle; a shelf on said body for supporting a stack of records, said passage being exposed immediately above and below said shelf; radial slots, one for each finger, extending outwardly from said passage, at least one of said slots opening outwardly of said adapter body adjacent said shelf so that the respective finger may extend outwardly of the adapter body into position for engagement with the lowermost record; means on said body at the side opposite said shelf sloped to lead the record stack down onto said shelf and terminating at a level a record thickness above the shelf whereby actuation of the shiftable lever projects the lever through the exposed passage and shifts a record off the shelf and beneath the sloped means onto the exposed finger; and a part of said body beneath the shelf for receiving a record from the exposed finger and guiding the record onto the turntable while the sloped means guides the succeeding record at the bottom of the record stack onto each shelf.

4. A spindle adapter for use with a record ejecting spindle having a record ejecting member and a plurality of fingers extending outwardly of the spindle and movable vertically relative to the spindle to lower an ejected record to a rotatable turntable, said adapter supporting and centering a large hole record stack for dropping of a lowermost record in the stack onto the turntable by operation of said record ejector, said adapter comprising: a body having a generally rectangular cross section with a pair of straight sides connected by relatively short sides curved correspondingly to the curvature of a record hole, said body having a shoulder on one of said curved sides to support a large hole record stack; a passage in said body for receiving the small hole record spindle; and longitudinal slots, one for each finger, extending radially outwardly from said passage, each slot having a width slightly in excess of the thickness of its respective finger so that said fingers are freely movable in said adapter, and at least one of said slots opening outwardly of said adapter body, so that the respective finger may extend outwardly of the adapter body into position for engagement with a record.

5. A spindle adapter for use with a record ejecting spindle having a record ejector member and a plurality of fingers extending outwardly of the spindle and movable vertically relative to the spindle to lower an ejected record to a rotatable turntable, said adapter supporting and centering a large hole record stack for dropping of a lowermost record in the stack onto the turntable by operation of said record ejector, an adapter body having a shoulder to support a large hole record stack, a passage in said body for receiving the small hole record spindle, a longitudinally extending slot extending radially outwardly of said passage for each finger, at least one of said slots opening outwardly of said adapter body, so that the respective finger may extend outwardly of the adapter body into position for engagement with a record, and said body having a record guiding surface at its lower end having limited frictional engagement with a record hole periphery.

6. A spindle adapter for use with a record changer having a rotatable turntable and a spindle of relatively small diameter for records having center holes of correspondingly small diameter; said spindle having a plurality of fingers extending outwardly therefrom for supporting a record stack, means mounting said fingers for movement into the interior of said spindle for ejecting the lowermost record in the record stack, and means on said spindle for holding the remaining records of the record stack during ejection of the lowermost record; said adapter comprising: a generally rectangular body for supporting and centering a stack of records with large diameter center holes, said body having a dimension in one direction almost equal to the diameter of the hole of a large center hole record and a lesser dimension in a transverse direction, said body having a passage extending for substantially the entire length thereof for placement on said spindle and a cap at the top of said body engageable with the upper end of the spindle to position said body on the spindle; a plurality of slots, one for each finger, extending radially outwardly from said passage, at least one of said slots opening outwardly of said adapter body so that the respective finger may extend outwardly of the adapter body into position for engagement with a record; and means on the opposite side of said body from said exposed finger and cooperating therewith for supporting a record stack, said last named means cooperating with the said holding means during the ejection of the lowermost record to support the remaining records in the record stack.

7. A spindle adapter for use with a record changer having a rotatable turntable and a spindle of relatively small diameter for records having center holes of correspondingly small diameter; said spindle having a plurality of first fingers extending outwardly therefrom for supporting a record stack, means mounting said fingers for movement into the interior of said spindle for ejecting the lowermost record in the record stack, a plurality of second fingers mounted in the interior of said spindle, and means for moving said second fingers outwardly of said spindle during ejection of the lowermost record to hold the remaining records of the record stack; said adapter comprising: a body having a generally rectangular cross section with a pair of straight sides connected by relatively short sides curved correspondingly to the curvature of a record hole; a passage in said body for receiving the small hole record spindle; a plurality of first slots, one for each first finger, extending radially outwardly from said passage, at least one of said slots opening outwardly of said adapter body so that the respective first finger may extend outwardly of the adapter body into position for engagement with a record; means on the opposite side of said body from said exposed first finger and cooperating therewith for supporting a record stack; at least one second slot extending radially outwardly from said passage and opening outwardly of said adapter body, said second slot adapted to receive one of said second fingers therethrough; and means on the opposite side of said adapter body from the exposed second finger and cooperating therewith for supporting the remaining records of the record stack during ejection of the lowermost record.

8. The invention defined in claim 7 wherein said adapter includes at least two of said outwardly opening first slots so that at least two of said first fingers extend outwardly from said adapter into a record supporting position.

9. The invention set forth in claim 8 wherein a second slot is disposed between said outwardly opening first slots.

10. A spindle adapter for supporting and centering large hole records and usable with a record changer having a rotatable turntable with a central small hole spindle and comprising: an adapter body formed of at least two sections; means on said body for fixedly attaching the same to said spindle so that large hole records can be played on said record changer; and means pivotally mounting each of said adapter body sections for pivotal movement away from said spindle while said adapter body remains fixedly attached thereto so that small hole records can be played on said record changer.

11. A spindle adapter for supporting and centering large hole records and usable with a record changer having a turntable with a central small hole spindle and comprising: a pair of substantially identical adapter body sections collectively defining an adapter body; means for fixedly mounting the adapter body on the spindle; means releasably securing said sections in an upright position on said spindle so that large hole records can be played on said record changer; and means pivotally mounting said sections for pivotal movement relative to one another out of said upright position and away from said spindle so that small hole records can be played on said record changer.

12. A spindle adapter for supporting and centering large hole records and usable with a record changer having a turntable with a circumferentially continuous recessed portion and a small hole spindle mounted therein, said adapter comprising: a pair of adapter body sections collectively defining an adapter body; means for fixedly mounting the adapter body on the spindle; means releasably securing said sections in an upright position on said spindle so that large hole records can be played on said record changer; and means mounting said sections for pivotal movement relative to one another out of said upright position and away from said spindle into said recessed turntable so that small hole records can be played on said record changer.

13. A spindle adapter for supporting and centering large hole records and usable with a turntable having a cylindrical recessed portion with a small hole spindle extending upwardly therefrom, said adapter comprising: a sleeve fixed on said spindle; first and second adapter body sections pivotally mounted on said sleeve and movable between a folded position wherein each section is disposed within said turntable recess so that the record changer can play small hole records, and an upright position embracing said spindle so that said record changer can play large hole records; and means releasably securing said sections in said upright position.

14. The invention defined in claim 13 wherein said last named means consists of a magnet secured to each adapter body section.

15. The invention set forth in claim 13 in which a well is provided in the recessed portion of the turntable, and wherein said sleeve is positioned in the well.

16. A spindle adapter for use with a record ejecting spindle having a record ejector member and a plurality of fingers extending outwardly of the spindle and movable vertically relative to the spindle to lower an ejected record to a rotatable turntable, said adapter supporting and centering a large hole record stack for dropping of a lowermost record in the stack onto the turntable by operation of said record ejector, an adapter body having a passage therein for receiving the small hole record spindle, means intermediate the adapter body for supporting a large hole record stack, a longitudinally extending slot extending radially outwardly of said passage for each finger, at least one of said slots opening outwardly of said adapter body, so that the respective finger may extend outwardly of the adapter body into position for engagement with a record, and said body having a record guiding surface at its lower end having limited frictional engagement with a record hole periphery.

References Cited by the Examiner

UNITED STATES PATENTS

| | | | |
|---|---|---|---|
| 2,926,019 | 2/1960 | Crotty | 274—10 |
| 3,092,391 | 6/1963 | Hammerand | 274—10 |
| 3,107,098 | 10/1963 | Hardy | 274—10 |

NORTON ANSHER, *Primary Examiner.*

C. PRICE, J. F. PETERS, *Assistant Examiners.*